Patented May 17, 1927.

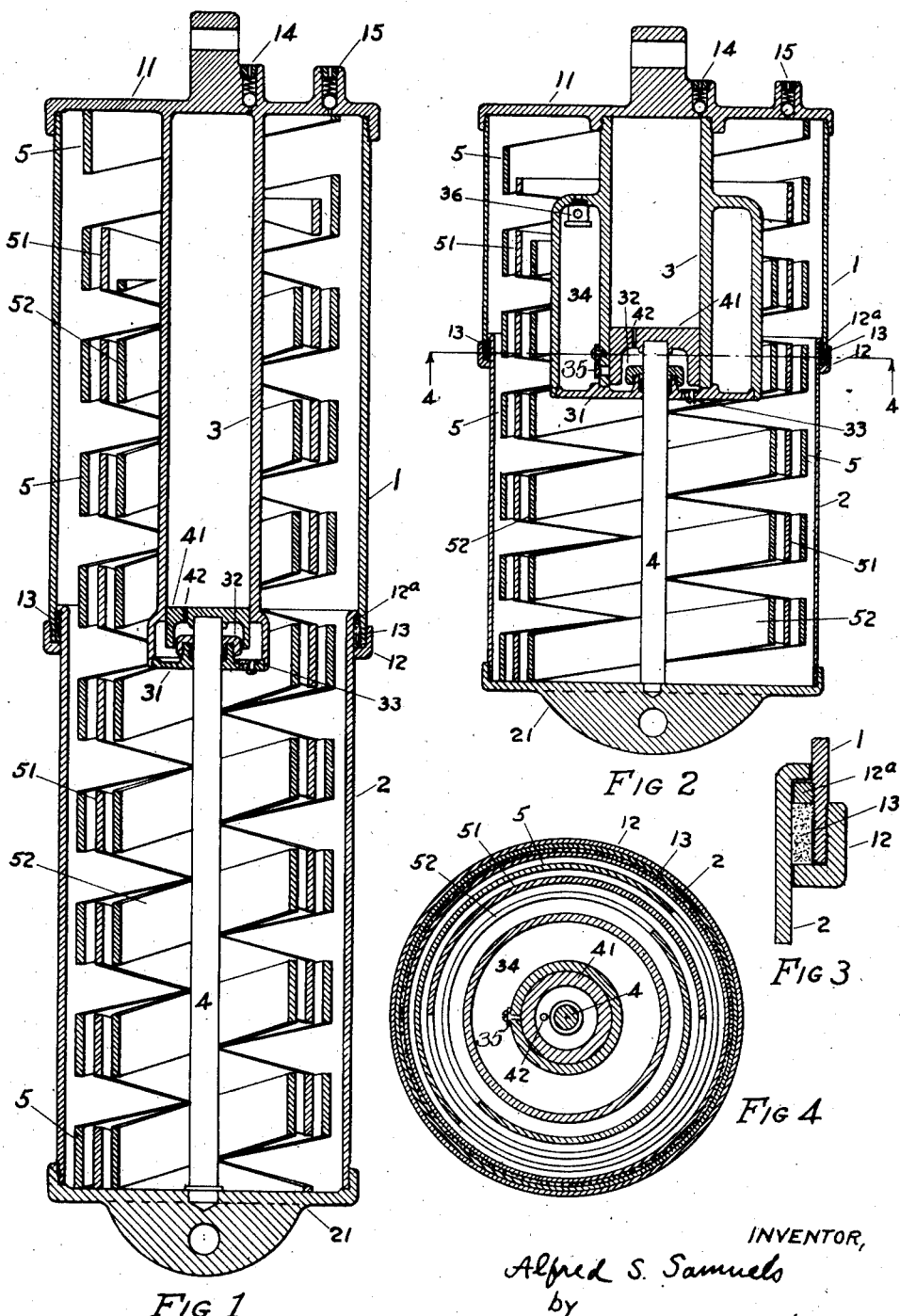

1,628,749

UNITED STATES PATENT OFFICE.

ALFRED S. SAMUELS, OF SAUGUS, MASSACHUSETTS.

SPRING AND RECOIL CHECK.

Application filed June 10, 1925. Serial No. 36,224.

My invention is a combined spring and recoil control intended to afford the primary spring suspension upon a vehicle or to be used as an auxiliary to other springs, and further, when the springs have been compressed in use, intended to control the action of the springs in returning to their normal shape, slowing them relatively slowly and progressively in their return to normal shape.

In the drawings:

Figure 1 is a sectional elevation of my device;

Figure 2 is a similar view on a reduced scale of a preferred form;

Figure 3 is a detail on an enlarged scale of the gland 12, 12ª;

Figure 4 is a section on line 4—4 of Figure 3, on a reduced scale.

My device consists of a telescoping casing 1, 2, each element, 1 or 2, of which is closed at its outer end by threaded heads 11, 21, respectively.

At the open end of one of the members, I preferably provide a gland, constituted of rings 12 and 12ª between which is compressed an annulus of felt or other suitable packing material, 13, designed to resist the passage of air to the interior of the casing, in operation, at the telescopic joint.

Secured to the head 11 and depending therefrom centrally, is a cylinder 3, closed at its lower end by a threaded head 31, provided with a central aperture, surrounded by a gland 32. Secured centrally of the head 21 and projecting upward through casing 2 and gland 32 into cylinder 3 is a piston rod 4, carrying upon its free end a piston 41. In the head 11 of cylinder 3 is a valve 14, opening outwardly to permit the passage of air and closing against the passage of air inwardly and also, a second valve 15, similar in operation to valve 14, but opening into the casing 1. At the lower end of cylinder 3 in the head 31 is a third valve, 33, opening to permit the passage of air to the interior of cylinder 3 and closing against the passage of air outwardly, the cylinder and piston, forming an air-pump. Surrounding the cylinder 3, as shown in Figure 2, I preferably provide an annular chamber 34, connected at the lower end with the interior of cylinder 3 by a check valve 35, opening to permit air to enter chamber 34, and trap it. At the upper end of chamber 34 I preferably provide an adjustable pop-valve 36 which may be set to open at a designed pressure and evacuate excess compressed air. These various valves are merely indicated in the drawings. They may be of any suitable construction, ball, flap or other, as desired.

Within the casing, 1, 2, is a helical spring, 5, extending from head 11 to head 21, under a designed compression sufficient to support the body when only partially or lightly loaded and tending to force elements 1 and 2 apart, this spring being, for example, of a right hand coil and, for example, of 10 convolutions. Within spring 5, is a second helical spring, 51 of, for example, a left hand coil and, for example, of 9 convolutions. Within spring 51 is, for example, a third helical spring, 52, of, for example, a right hand coil and for example, of 8 convolutions. The gist of the matter being that each spring be of opposite coil to adjacent springs and that the several springs be of progressively decreasing length, the object being to prevent the springs, in action, from becoming entangled and to give a progressively increasing resistance to telescoping of the members 1, 2, and a progressively decreasing force of action as the members, 1, 2, return to extended position, thus providing a variable resistance compound spring for an increase of load or any shock tending to bring the body and running gear together. All three springs are given such a clearance from adjacent members as to provide for the lateral expansion of the springs under compression. All three springs are preferably secured in proper position at one end to one of the heads 11, 21. I have described and shown three springs, but two or more may be employed to obtain the progressive resistance effect and if the progressive resistance effect is not desired, one spring 5 may be employed.

I have shown the three springs 5, 51, 52, as of equal size, except as to length. It is obvious, of course, that if found expedient, the springs may be varied from one another in their section, to give varying resistances, as desired.

*Operation.*—Four or more of the mechanisms are preferably interposed between the running gear of a four-wheeled vehicle and the body of the vehicle, the casing 1 being preferably secured to the body and the casing 2 to an axle. The weight of the body and a light load will be sustained in whole or part by the springs 5 of the several mechanisms, the apparatus being normally nearly extended. When force is applied to the vehicle tending to force the running gear and the body of the vehicle together, the two elements 1, 2, are forced together, more or less, and the springs within successively compressed to resist the telescoping of elements 1, 2. At the same time the air within elements 1, 2, is more or less expelled through outlet valve 15. Also, at the same time, the piston 41 is forced along cylinder 3, the inlet valve 33 opening behind the piston to admit air and the valve 14 opening to allow air to pass out from above the piston. Assuming that the shock is sufficient to completely telescope members 1, 2, a large part of the air within those members will be expelled through valve 15 and substantially all the air above piston 41 will be expelled through valve 14, at the same time air passing through valve 33, into the interior of cylinder 3, below piston 41. Upon the completion of the telescoping movement the springs 5, 51, 52, will all be under compression and will strongly tend to extend the telescoping members 1, 2. As this action gets under way, spring 52 will first be released from compression and will reduce the force tending to extend members 1, 2. Spring 51 will likewise, in its turn, go out of action and finally the only extending force will be spring 5. The air within members 1, 2, during the extending movement will become attenuated, since no air can re-enter through the outlet valve 15 and this will give a progressively increasing resistance to extension by pressure of the outside air, as the spring force, tending to extend the parts 1, 2, progressively decreases as the springs 52, 51, successively go out of action and the spring 5 becomes less compressed.

As the parts 1, 2, are extended, piston 41 will travel along cylinder 3, toward the free or lower end thereof, creating a strong vacuum above the piston, since air cannot enter through outlet valve 14, and progressively compressing the air below the piston, since all air below the piston is trapped and cannot escape through the inlet valve 33.

The length and diameter of cylinder 3 are necessarily conditioned upon the telescoping action of the casing and the space required for the springs. In order to provide a greater air body below the piston 41 than would otherwise be possible, thus enhancing the cushioning effect of the trapped air and preventing too high a compression of a relatively small volume of air, I may surround the cylinder 3 with an annular chamber 34 connected through a check valve, 35 in a passage, with the interior of cylinder 3. On the down stroke of piston 41 air will be compressed into chamber 34 and trapped; the pressure becomes effective however upon each down stroke of the piston, as the valve 35 is opened. The function of check valve 35 is to prevent the return of compressed air below the cylinder, which would work to oppose the effort of the springs on the telescoping of parts 1, 2, and would also prevent the functioning of the inlet valve 33. Repeated oscillations, due to violent shock, compress air below the piston 41 and raise the resistant air pressure at each oscillation till the oscillations are controlled. A pressure relief valve 36 may be connected to chamber 34 to permit the escape of compression, when a designed maximum is attained (see Figure 2). In the piston shown in the form of my device illustrated in Figure 1, I provide a needle hole leak-passage, indicated at 42. In this form of my device high pressure may be created below the piston by a violent oscillation or oscillations, and the leak is provided to permit this pressure to slowly escape and allow normal conditions to establish themselves. I have also shown in the form of my device illustrated in Figures 2 and 4, a similar leak passage 42, which I prefer to use also in this form as during periods of smooth riding it permits the device to return to original conditions without in any way affecting its utility.

The result of these arrangements and interactions is, that upon a shock, the approach of the body to the running gear is progressively slowed by the progressively increasing resistance of the several springs which successively come into action and bring the approach of the parts to a gradual complete halt and that the rebound is in like manner resisted progressively and increasingly by air pressure until the separation of the running gear and the body is brought to a gradual halt, with the result that the occupants of the vehicle are not incommoded by sudden cessation of motion in either direction, nor by repeated oscillations.

I claim:

1. In a compound vehicle spring, a telescoping casing, having an air-tight packing at the telescope joint; a plurality of nested coiled springs of differing lengths secured within the casing, to give a successively increasing resistance to telescoping of the casing; an outwardly opening check valve in the walls of the casing; an inner air pump chamber secured to a head of one of the telescoping elements; a piston and rod secured to the other head, the piston working in the pump chamber; an inlet valve at the free end of the pump chamber; an outlet valve at the other end of the pump chamber.

2. In a compound vehicle spring, a telescoping casing, having an air-tight packing at the telescope joint; a plurality of nested coiled springs of differing lengths secured within the casing to give a successively increasing resistance to telescoping of the casing; an outwardly opening check-valve in the walls of the casing; an inner air pump chamber, secured to a head of one of the telescoping elements; a piston and rod secured to the other head, the piston working in the pump chamber; an inlet valve at the free end of the pump chamber; an outlet valve at the other end of the pump chamber; an air chamber connected to the pump chamber by a passage from the free end of the pump chamber, having an outwardly opening check valve to control the passage to permit air to pass from the pump chamber to the air chamber and prevent its return.

3. In a compound vehicle spring, a telescoping casing, having an air-tight packing at the telescope joint; a plurality of nested coiled springs of differing lengths secured within the casing to give a successively increasing resistance to telescoping of the casing; an outwardly opening check-valve in the walls of the casing; an inner air pump chamber, secured to a head of one of the telescoping elements; a piston and rod secured to the other head, the piston working in the pump chamber; an inlet valve at the free end of the pump chamber; an outlet valve at the other end of the pump chamber; an air chamber connected to the pump chamber by a passage from the free end of the pump chamber, having an outwardly opening check-valve to control the passage, to permit air to pass from the pump chamber to the air chamber and prevent its return; a relief valve connected to the air chamber to release excess pressure.

4. In a compound vehicle spring, a telescoping casing, a plurality of nested coiled springs of differing lengths secured within the casing, to give a successively increasing resistance to telescoping of the casing; an inner air pump chamber secured to a head of one of the telescoping elements; a piston and rod secured to the other head, the piston working in the pump chamber; an inlet valve at the free end of the pump chamber; an outlet valve at the other end of the pump chamber.

5. In combination with the structure of claim 4, an air chamber connected to the pump chamber by a passage from the free end of the pump chamber; an outwardly opening check valve controlling the passage, to permit air to pass from the pump chamber to the air chamber and prevent its return.

Signed at Boston, Massachusetts, this ninth day of June, 1925.

ALFRED S. SAMUELS.